(12) United States Patent
Chung

(10) Patent No.: US 6,452,571 B1
(45) Date of Patent: Sep. 17, 2002

(54) VISUAL DISPLAY SYSTEM

(76) Inventor: Chi Ming Tony Chung, 2nd Floor, 28-34 Wing Lok Street, Sheung Wan (HK)

( * ) Notice: Subject to any disclaimer, the term of this patent is extended or adjusted under 35 U.S.C. 154(b) by 252 days.

(21) Appl. No.: 09/613,242

(22) Filed: Jul. 10, 2000

(51) Int. Cl.$^7$ ................................................ G09G 5/00
(52) U.S. Cl. ........................................ 345/7; 359/630
(58) Field of Search ............................... 345/6, 7, 8, 9; 348/51, 14.1, 14.16; 359/630, 632, 633; 340/980

(56) References Cited

U.S. PATENT DOCUMENTS

| | | | |
|---|---|---|---|
| 4,742,331 A | * 5/1988 | Uomori et al. ................ | 348/51 |
| 5,421,589 A | * 6/1995 | Monroe .......................... | 345/9 |
| 5,666,153 A | * 9/1997 | Copeland | |
| 5,751,259 A | * 5/1998 | Iwamoto ......................... | 345/8 |
| 6,097,353 A | * 8/2000 | Melville et al. ................ | 345/8 |

\* cited by examiner

*Primary Examiner*—Regina Liang
(74) *Attorney, Agent, or Firm*—Leydig, Voit & Mayer, Ltd.

(57) ABSTRACT

A visual display system for use in conjunction with a video screen connected to a computer for displaying images of an object taken at successive angles. The system includes a platform having a circular body with an opening, above the screen and an annular turntable supported by the body for turning. A sensor connected to the computer senses the angular position of the turntable relative to the body. The system further includes an inclined transparent glass plate located directly above the opening for reflecting an image from the screen to form a virtual image in the space above the body for viewing through the plate by an observer. The turntable is manually rotatable to control the screen to display an image of the object corresponding to the angle through which the turntable is turned, thereby turning the virtual image for viewing of the object along different directions.

10 Claims, 2 Drawing Sheets

VISUAL DISPLAY SYSTEM

The present invention relates to a visual display system for use in conjunction with a video screen to display a virtual image.

BACKGROUND OF THE INVENTION

Visual display systems for use with a video monitor are generally known, for example as disclosed in published Australian Patent Application No. 13632/95, in which a transparent glass plate is used for reflecting an image for viewing. Existing computer programs allow the image of an object displayed on a video screen to be turned by using the mouse or keyboard, so that the object can be viewed at different angles.

The invention seeks to provide an improved visual display system for displaying a virtual image of an object, which also allows the image to be turned in a more convenient or natural way.

SUMMARY OF THE INVENTION

According to the invention, there is provided a visual display system for use in conjunction with a video screen connected to an electronic equipment for displaying images of an object taken at successively changing angles, which system comprises a platform having a body formed with an opening for use above the screen and a member supported by the body for turning about a vertical axis in opposite direction, a sensor connected to the equipment for sensing the angular position of the member relative to the body, and an inclined transparent reflective plate located directly above the opening for reflecting a said image from said screen to form a virtual image in the space above the body for viewing by an observer through the plate, the member being manually rotatable to control the screen to display the next image of the object corresponding to the angle through which the member is turned, thereby turning said virtual image for viewing of said object at different directions.

Preferably, the sensor is arranged to detect turning of the member exceeding a predetermined angle for, in response, controlling the screen to display the next image of said object, said angle being substantially the angle at which the successive images are taken apart.

In a specific construction, the member is annular and extends around the space.

More specifically, the body is substantially circular and the member is supported co-axially around the body by means of a bearing.

It is preferred that the sensor is provided by a stationary cursor control device having a track ball in engagement with the member for sensing its relative position.

More preferably, the cursor control device is in the form of a computer mouse resting with its track ball on the member.

More preferably, the cursor control device has two control buttons and is trapped within a stationary casing, the casing incorporating a pivotable bar for operating the buttons.

In a preferred embodiment, the platform includes a transparent dome located on the body enclosing the plate and defining the space.

The visual display system may preferably include a mirror for support in front of the screen that extends upright, which mirror extends substantially parallel to the plate for reflecting an image from the screen to reach the plate for subsequent reflection.

The visual display system may preferably further include an adjustable stand for supporting the mirror.

BRIEF DESCRIPTION OF DRAWINGS

The invention will now be more particularly described, by ay of example only, with reference to the accompanying drawings, in which.

DETAILED DESCRIPTION OF PREFERRED EMBODIMENTS

Figure 1:
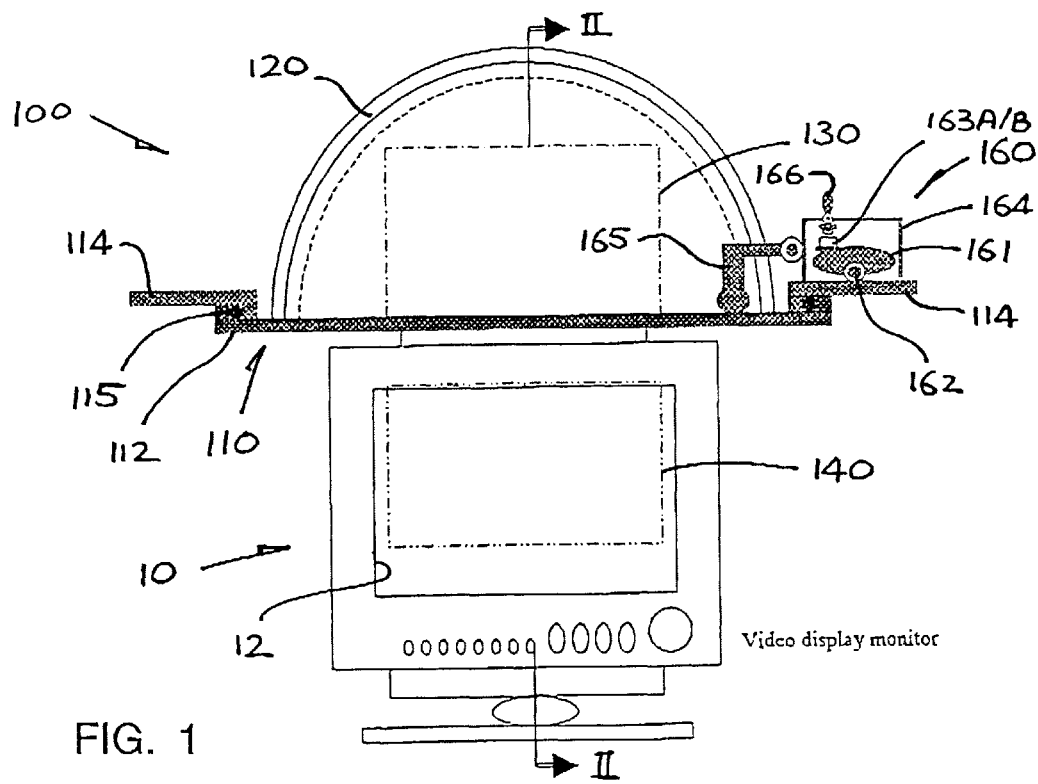
FIG. 1 is a front view of an embodiment of a visual display system in accordance with the invention, said system including a controller shown in cross-section.
Figure 2:
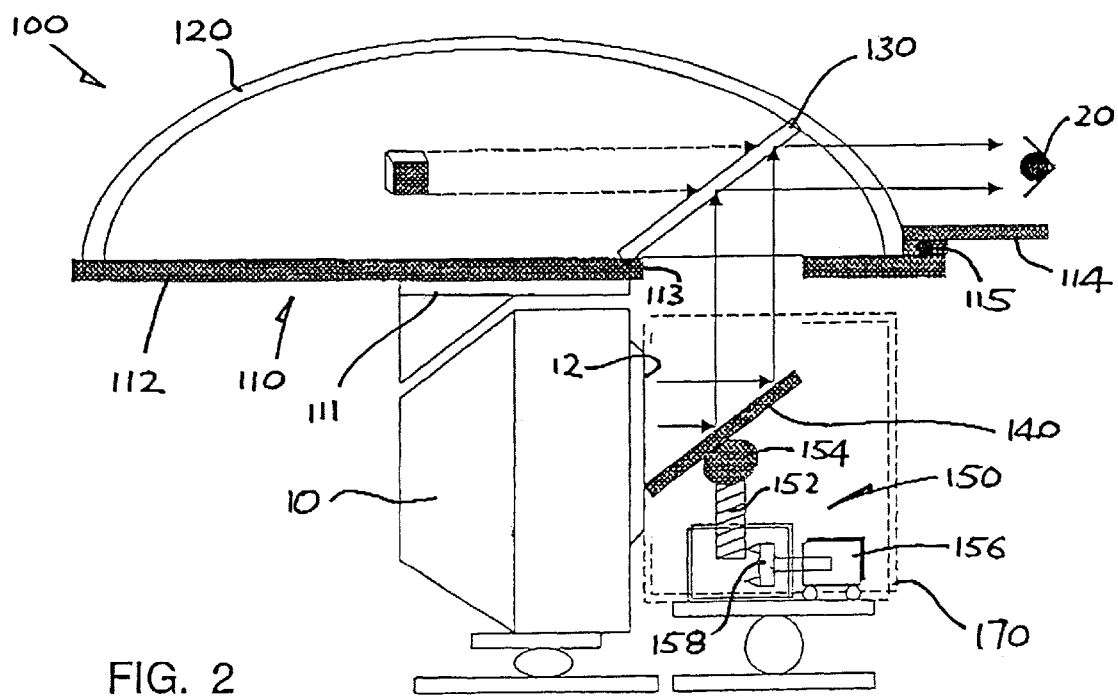
FIG. 2 is a cross-sectional side view of the system of FIG. 1 taken along line II—II.
Figure 3:
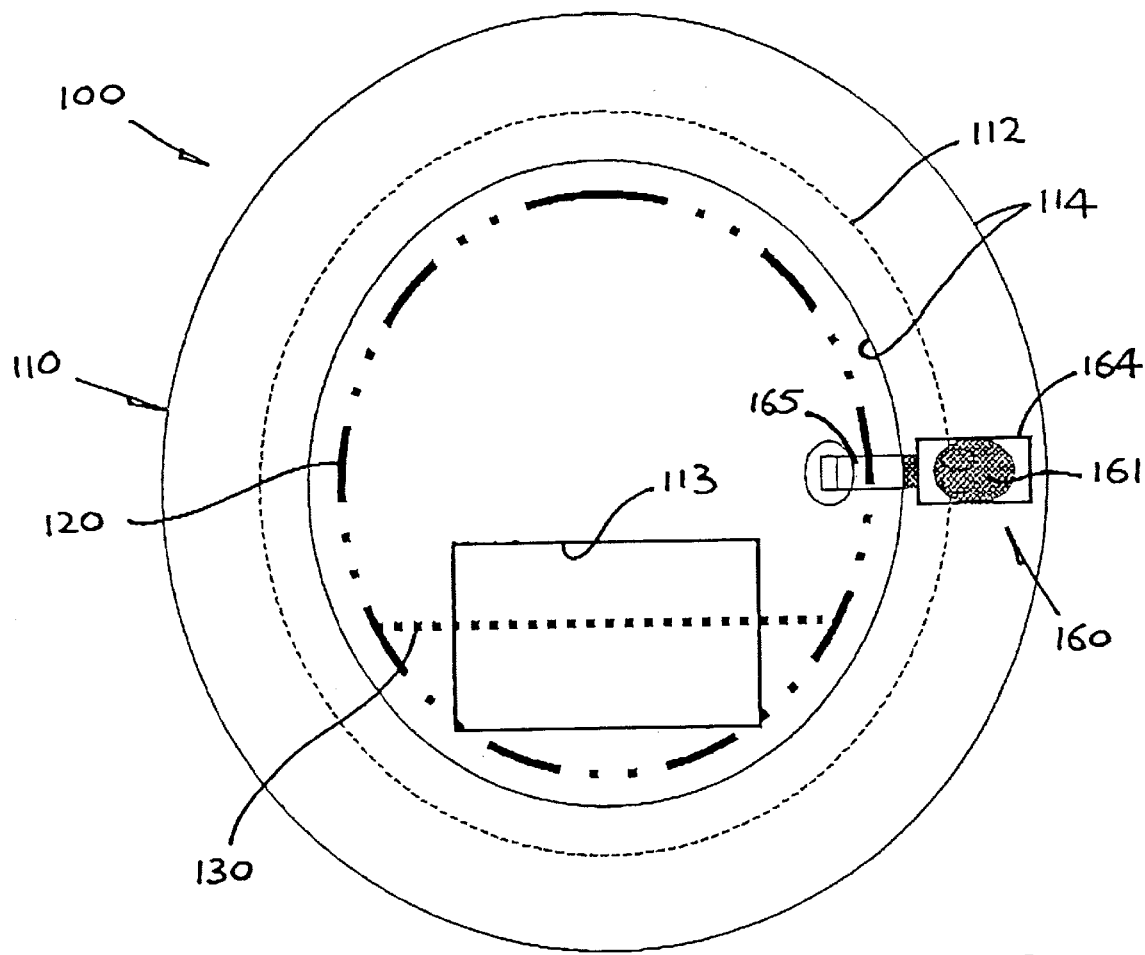
FIG. 3 is a top plan view of the system of FIG. 1.
Figure 4:
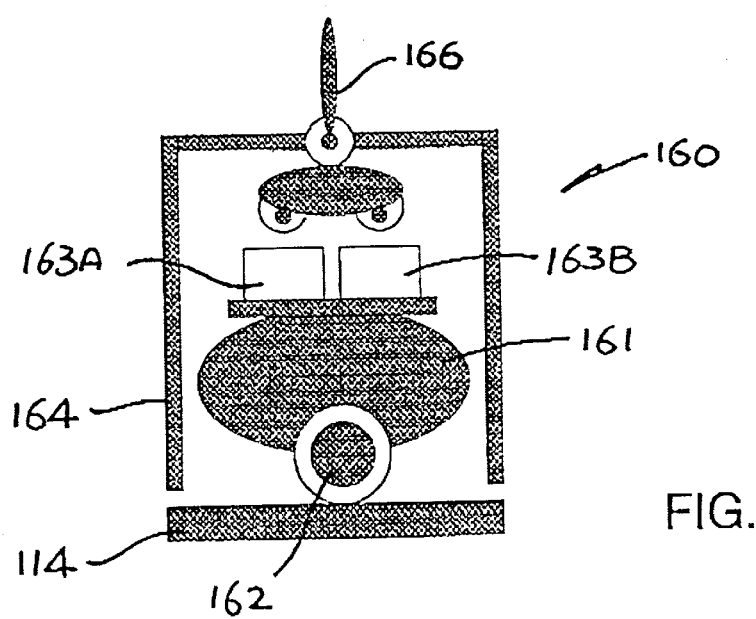
FIG. 4 is an enlarged cross-sectional front end view of the controller of FIG. 1.

Referring initially to FIGS. 1 to 3 of the drawings, there is shown a visual display system 100 embodying the invention, which system 100 is to be used in conjunction with a video monitor 10 having a screen 12 and connected to an electronic equipment such as a computer (not shown) The display system 100 comprises a platform 110 placed atop the monitor 10, the platform 110 including a transparent dome 120, and a transparent glass plate 130 inside the dome 120, a mirror 140 supported immediately in front of the video screen 12 by a stand 150, and a controller 160 connected to the computer. The platform 110 has a circular body 112 which is located centrally on the monitor 10 via a rubber pad 111 and supports the dome 120, and includes an annular turntable 114 which is supported co-axially on and around the body 112 by an annular ball race bearing 115 for rotation about a common vertical axis. The body 112 includes a rectangular opening 113 at a position directly above the space immediately in front of the video screen 12.

The mirror 140 is inclined at an angle of about 45° upwards, facing the video screen 12 for reflecting an image of an object on a dark background from the screen 12 upwards through the platform opening 113. The glass plate 130 is positioned directly above the opening 113 and extends substantially parallel to the mirror 140 below for reflecting the image forwards for viewing by an observer 20. The glass plate 130 reflects the image by total internal reflection. As the observer 20 can see through the glass plate 130, the image he perceives will appear to be at a position behind the glass plate 130, whereby a virtual image of the object is created inside the dome 120.

By reason of the fact that the background of the original image as displayed on the video screen 12 is dark and therefore unnoticeable, the image created in the dome 120 can be seen against the actual background behind the dome 120, which makes that image virtual.

The stand 150 includes a screw-threaded vertical shaft 152 supporting the mirror 140 through a ball joint 154, and an electric motor 156 provided with an output gear 158 for turning and thus translating the shaft 152 up-and-down to adjust the vertical position of the mirror 140 relative to the video screen 12. The stand 150 is also movable back-and-forth as well as sideways to adjust the relative horizontal position of the mirror 140. The size and relative position of the mirror 140 are determined such that the mirror only reflects the display area of the video screen 12.

The mirror 140 and stand 150 are sealed within a dark enclosure 170 against ambient light. The enclosure 170 is open only on the front side facing the video screen 12 and on the top side in alignment with the platform opening 113, to enable operation of the mirror 140.

The controller 160 is implemented by a computer mouse 161 which rests with its track ball 162 on the turntable 114 and is trapped within an open-based casing 164. A crooked arm 165 connects the casing 164 to the platform body 112, such that the casing 164 and, in turn, the mouse 161 is held stationary. Turning of the turntable 114 by the observer 20 will operate the track ball 162, whereby the mouse 161 provides a control signal indicative of the relative angular position of the turntable 114 to the computer.

The controller 160 is located on the right side of the platform 110, with the mouse 161 extending radially with respect to the turntable 114. The casing 164 incorporates a control bar 166 for operating left and right buttons 163A and 163B of the mouse 161 to provide additional controls to the observer 20. The control bar 166 is pivotable forwards to press the left button 163A and backwards to press the right button 163B.

Images of the object are created in advance, which are taken at successively changing angles of say 10° around the object, without any background and foreground information, to collectively represent the object in isolation. The images may be produced as computer graphics or by taking photographs. A series of such images may be downloaded from a specific website to the computer, or otherwise received by the computer -i-n by any other means, for display by the subject display system 100.

In operation, rotation of the turntable 114 to the left or right by an angle exceeding 100 will be detected by the controller 160. In response, the computer displays the next image of the object in that direction on the video screen 12, whereupon the corresponding virtual image is created inside the dome 120 for viewing by the observer 20. The turntable 114 is useful as a convenient and real-life means for turning the image so that the object can be viewed from different directions, whereby a virtual 3D object image is simulated.

The images created of the object may include one or more magnified images of the object taken at each angle to show its details. For this purpose, the control bar 166 of the controller 160 may be pulled forwards to zoom the virtual image by operating the left button 163A or pushed backwards to retrieve the previous image by operating the right button 163B. While the normal size image is being displayed, the control. bar 166 may be pushed backwards to remove the object.

Alternatively, the images may include those taken at successively changing angles vertically around the object, such that at every orientation of the object there is a series of images showing the top and bottom of the object, whereby the complete object can be collectively represented for display. In this regard, the control bar 166 may be pivoted forwards or backwards to roll the virtual image downwards or upwards respectively.

The virtual display system 100 may be used at home in combination with a personal computer for shopping at an on-line shop on the Internet, in that the user is able to have a closer look at a particular product before a purchase is made. Another example of use is at conventional shops for displaying items that are out of stock or otherwise unavailable for physical examination.

It is envisaged that the monitor 10 may be placed to have its screen 12 lying horizontally facing upwards, in which case the glass plate 120 may receive an image directly from the screen 12 without the use of the mirror 140. Although the dome 120 is preferred to define a space on the platform 110 in which the virtual image is perceived, it is optional.

The invention has been given by way of example only, and various other modifications of and/or alterations to the described embodiment may be made by persons skilled in the art without departing from the scope of the invention as specified in the appended claims.

What is claimed is:

1. A visual display system for use in conjunction with a video screen connected to an electronic equipment for displaying images of an object at successively changing angles, the visual display system comprising:

a platform having a body with an opening for use above a video screen and a member supported by the body for turning about a vertical axis, a sensor for sensing angular position of the member relative to the body, and an inclined partially transparent and partially reflective plate located directly above the opening for reflecting an image from the video screen to form a virtual image above the body for viewing by an observer through the plate, the member being manually rotatable to control the monitor screen to display an image of the object corresponding to an angle through which the member is turned, thereby turning the virtual image for viewing of the object along different directions.

2. The visual display system as claimed in claim 1, wherein the sensor detects turning of the member through an angle exceeding a threshold angle for controlling the video screen to display the next image of the object, the threshold angle being substantially the angle by which successive images are separated.

3. The visual display system as claimed in claim 1, wherein the member is annular and the space.

4. The visual display system as claimed in claim 3, wherein the body is substantially circular and including a bearing co-axially supporting the member.

5. The visual display system as claimed in claim 1, wherein the sensor comprises a stationary cursor control device having a track ball in engagement with the member for sensing relative position of the member.

6. The visual display system as claimed in claim 5, wherein the cursor control device is a computer mouse.

7. The visual display system as claimed in claim 5, wherein the cursor control device has two control buttons and is contained within a stationary casing, the casing incorporating a pivotable bar for operating the buttons.

8. The visual display system as claimed in claim 1, wherein the platform includes a transparent dome located on the body enclosing the plate and defining the space.

9. The visual display system as claimed in claim 1, including a mirror supported in front of the video screen extending substantially parallel to the plate for reflecting the image from the video screen to the plate.

10. The visual display system as claimed in claim 9, including an adjustable stand supporting the mirror.

* * * * *

UNITED STATES PATENT AND TRADEMARK OFFICE
CERTIFICATE OF CORRECTION

PATENT NO. : 6,452,571 B1
DATED : September 17, 2002
INVENTOR(S) : Chi Ming Tony Chung It is certified that error appears in the above-identified patent and that said Letters Patent is hereby corrected as shown below:

Column 2,
Line 6, change "ay" to -- way --.

Column 3,
Line 28, change "-i-n" to -- in --.
Line 32, change "100" to -- 10° --.

Column 4,
Line 3, change "120" to -- 130 --.

Signed and Sealed this

First Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,452,571 B1                                                  Page 1 of 1
DATED         : September 17, 2003
INVENTOR(S)   : Chi Ming Tony Chung It is certified that error appears in the above-identified patent and that said Letters Patent is hereby corrected as shown below:

<u>Column 3,</u>
Line 28, delete "in".

Signed and Sealed this

Ninth Day of September, 2003

JAMES E. ROGAN
*Director of the United States Patent and Trademark Office*